April 16, 1929. R. H. MANCHESTER ET AL 1,709,139
LIQUID TESTING DEVICE
Filed Nov. 17, 1927
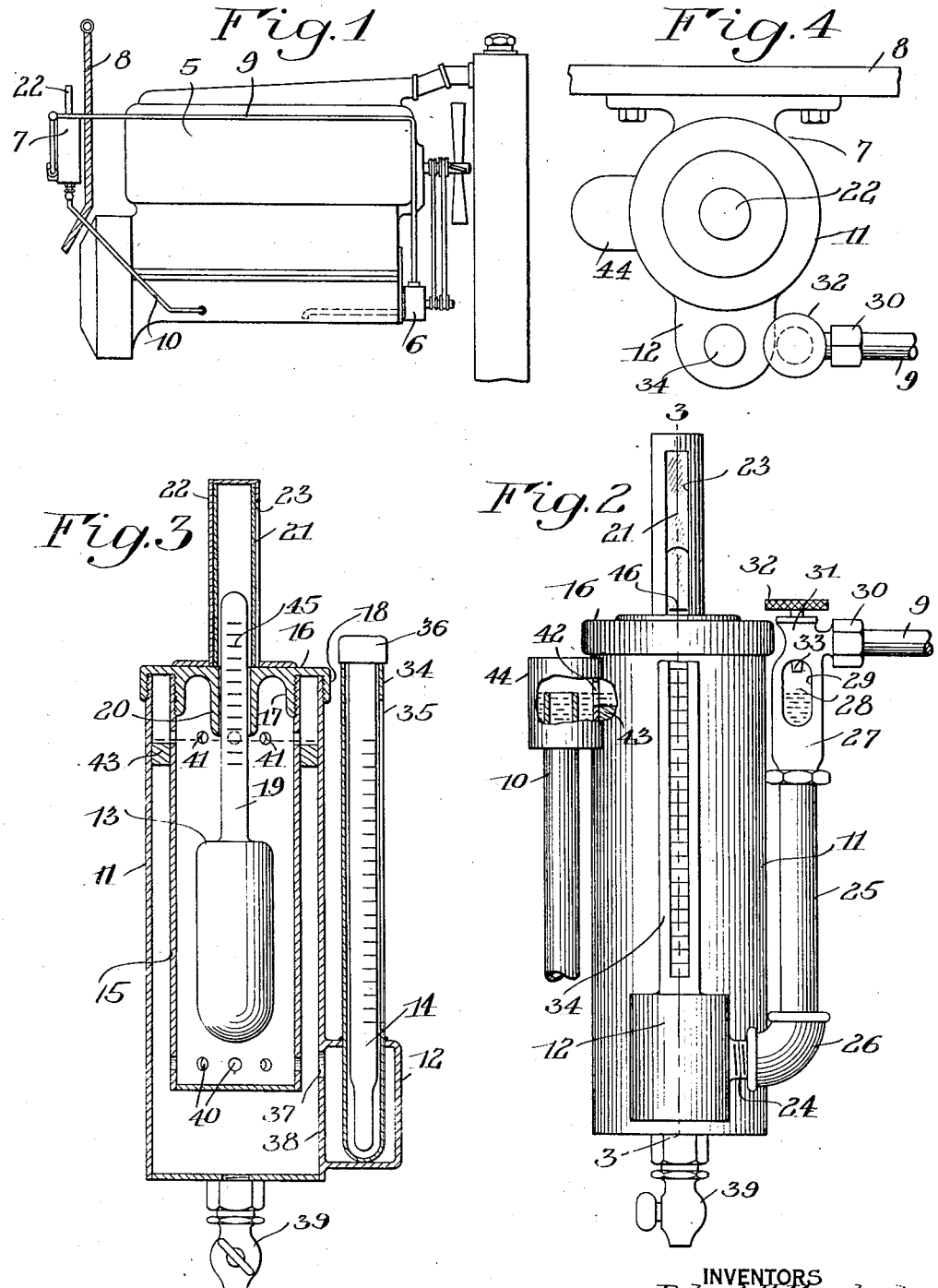
INVENTORS
Robert H. Manchester
BY Leonard W. Ely
Cumpston & Griffith
their ATTORNEYS Patented Apr. 16, 1929.

1,709,139

UNITED STATES PATENT OFFICE.

ROBERT H. MANCHESTER, OF ROCHESTER, AND LEONARD W. ELY, OF AUBURN, NEW YORK.

LIQUID-TESTING DEVICE.

Application filed November 17, 1927. Serial No. 233,878.

This invention relates to liquid testing devices and more particularly to devices of this nature capable of indicating the condition of liquids, such as crank case oil used in internal combustion engines, one object of the invention being the provision of an efficient device of this nature of relatively simple and durable construction, having simple means for readily indicating both the specific gravity and the temperature of the liquid to be tested. Another object is the provision of a device of this type constructed in a manner adapted to eliminate effects such as foaminess or turbulence in the liquid which would render the device inaccurate and thereby obtaining more uniform, accurate and reliable readings.

To these and other ends the invention resides in certain improvements and combinations of parts, all as will be hereinafter more fully described, the novel features being pointed out in the claims at the end of the specification.

In the drawings:

Fig. 1 is a side elevation of an internal combustion engine equipped with a device embodying the present invention;

Fig. 2 is a front view of the device;

Fig. 3 is a vertical section taken substantially on line 3—3 of Fig. 2, and

Fig. 4 is a plan view of the device.

Similar reference numerals throughout the several views indicate the same parts.

The present embodiment of the invention provides a device of the character described of a simple and rugged form, capable of being manufactured at moderate cost, and being particularly advantageous for use on automobile instrument boards for giving a constant and accurate indication of the condition or quality of oil present in the crank case so that the operator is at all times kept informed whether his oil is suitable for lubricating purposes; and as soon as the quality of the oil changes to an extent at which the engine can no longer operate efficiently therewith, he will be warned that the oil should be renewed. To this end the invention, as disclosed, is embodied in conjunction with a conventional form of internal combustion engine and comprises a receptacle adapted to retain a quantity of oil, which is kept at a desired level by a flow of oil from the usual oil pump, and having a hydrometer and thermometer associated therewith for indicating the density and temperature of the oil.

Thus the operator, after reading both the hydrometer and the thermometer, can ascertain by computation or by reference to a suitable chart whether the oil is still suitable for efficient lubricating purposes.

Referring more particularly to the drawings, there is indicated at 5 in Fig. 1 an internal combustion engine having a usual form of pump 6 for circulation of the oil through the engine. A liquid testing device 7 is suitably mounted on the instrument board 8 in position to be viewed by the operator and is connected to the pump 6 by an oil delivery line 9 and to the crank case by a discharge or return line 10.

The liquid testing device 7 may have various constructions, but in the present instance there is shown a reservoir having a primary or central chamber 11 and a secondary or auxiliary chamber 12. A hydrometer 13 and thermometer 14 both of more or less usual form are placed in the reservoir for the purpose of indicating the condition of the liquid passing therethrough. The hydrometer is preferably located in the central chamber 11 of the reservoir and the thermometer is preferably located in the auxiliary chamber 12.

The reservoir 11 has preferably associated therewith an inner casing or baffle means 15 held in place therein by means of a cap 16 which, in the present instance, has downwardly projecting threaded flanges 17 and 18 engaging respectively the ends of the casing 15 and the reservoir 11.

Means are provided for guiding the stem 19 of the hydrometer. This means comprises, in the present instance, a downwardly projecting tubular part 20 formed integrally on the under side of the cap 16. On the upper surface of the cap 16 is supported a transparent tube 21, preferably of glass, provided with an outer protecting tube 22, preferably of metal, having an opening 23 therein through which the end of the hydrometer stem 19 may be viewed.

The liquid to be tested is preferably conducted first into the auxiliary chamber 12 of the reservoir. For this purpose there is provided a suitable connecting member preferably in the form of a threaded nipple 24 projecting from the outer wall of the chamber 12. To the nipple 24 is joined an upright conduit pipe 25 by means of an ordinary pipe elbow 26.

The upper end of pipe 25 is connected to a sight feed member 27 having an inner tube 28 of glass or other transparent material, the member 27 being cut away at 29 for the purpose of observing the flow of liquid to the device. A coupling 30 on the sight feed member 27 connects it with the oil delivery line 9.

Means are preferably provided for regulating the inflow of oil to the device through pipe 9. For this purpose, in the present embodiment, a regulating valve 31 is formed in the upper end of the sight feed member 27 and is provided with a knob 32 for adjusting the flow through a nozzle 33.
The thermometer 14 may be arranged in various ways with relation to the chamber 12, but in the present instance the thermometer is enclosed within a tubular guard member 34 having a portion cut away at 35 to permit viewing of the thermometer stem therethrough. The lower end of the guard member 34 is preferably closed and extends into the chamber 12, being preferably held in place therein by soldering or welding the sides of the member 34 to the top wall of chamber 12. The top of the tubular guard member 34 is conveniently closed by a removable cap 36.

It is apparent that the incoming oil from the crank case will flow through the auxiliary chamber 12 of the reservoir and come first into substantial contact with the guard 34 surrounding the bulb of the thermometer 14. After passing through the chamber 12, the oil is next conducted to the chamber 11 through an opening 37 in the upper part of the wall section 38 which separates the chambers 11 and 12. This wall section 38 is in the nature of a baffle between the thermometer and the hydrometer and due to this construction the lower end of the chamber 11 below the opening 37 serves as a trap for retaining water as well as solid matter carried in by the oil, which, being heavier than the oil, will settle to the bottom. The water and other sediment may be drained from the chamber 11 from time to time by means of a drain cock 39 of usual construction.

The casing or baffle means 15, referred to above, is preferably closed at its lower end and is provided with a plurality of inlet openings or perforations 40 in the sides thereof and preferably adjacent its lower end through which the oil may pass into contact with the hydrometer 13. At the upper portion of the casing 15 there is provided a plurality of outlet openings or perforations 41 which permit the oil to flow from the casing to an outlet opening 42 in the upper part of the wall of chamber 11 of the reservoir.

In order to prevent the incoming oil from flowing upwardly between the casing 15 and the walls of reservoir 11 there is provided a baffle means in the form of a ring 43, of any suitable material, positioned in contact with the outer wall of the casing 15 and the inner wall of reservoir chamber 11 and intermediate the inlet openings 40 and outlet openings 41. It is apparent that the ring 43 serves also as an additional spacing means to hold the casing 15 centrally within the reservoir. In practice the ring 43 is preferably somewhat porous or otherwise adapted for the passage of air upwardly therethrough to insure that the space between the casing and reservoir will be kept filled with oil.

The opening 42 communicates with a chamber 44, secured to the wall of the reservoir 11, into which the upper end of the return pipe 10 is suitably secured. The position of the end of the pipe 10 thus determines the level of the liquid in the reservoir and it is placed in such position that the scale 45 on the hydrometer will be in proper relation to a reference line 46 marked or cut on the glass tube 21.

The device is installed substantially as illustrated in Fig. 1, with the inlet pipe 9 leading from the pump 6 to the reservoir and the return pipe 10 leading from the upper end of the reservoir back to the crank case.

After the device has become filled with oil substantially as illustrated in Fig. 2, it is ready for normal operation. As soon as the internal combustion engine 5 is started up the pump 6 will begin to force oil to the various parts of the engine and at the same time will force it to the testing device 7 through the pipe 9. The valve 31 is adjusted by the knob 32 until a stream of the desired volume is flowing into the vertical inlet conduit 25. Any air bubbles carried in by the stream of oil will be trapped within this conduit so that the interior of the reservoir 12 will be substantially free from any foam. The oil passes down the conduit 25 relatively slowly and surrounds the guard 34 at the bulb end of the thermometer 14 within the chamber portion 12 of the reservoir and next passes out of chamber 12 through opening 37 into the chamber 11 and surrounds the lower end of the baffle casing 15. Any water or solid matter heavier than the oil which has been carried over thereby will settle to the bottom of reservoir 11 and may be removed from time to time through the drain cock, 39. The oil gently and gradually passes through the openings 40 in the lower end of the casing 15 and displaces the previous oil surrounding the hydrometer which will then flow out of the openings 41 and 42 to the end of overflow pipe 10. The overflow pipe 10 carries away the oil as rapidly as it is fed into the reservoir to thus maintain the oil therein at a contant level. The hydrometer, which is graduated in any suitable unit, as for example in degrees Baumé, will constantly indicate the relative density of the oil in the crank case which, of course, will vary as the temperature of the oil increases. By reading the temperatures on the thermometer scale the operator may correct the hydrometer reading in accordance therewith by computation or by reference to a suitable chart prepared for the purpose and may thus quickly ascertain whether the oil is suitable for proper engine efficiency. If the specific gravity of the oil is too low at the corresponding temperature to properly lubricate the parts, the operator will be warned that it is necessary to renew the oil.

It is apparent from the foregoing that the oil in the testing device is substantially free from foam by the time it reaches the thermometer bulb and is substantially free from any turbulence by the time it reaches the hydrometer so that the hydrometer will be constantly held in a relatively quiet body of the oil and thereby eliminate any tendency of the hydrometer to bob up and down which would make accurate readings difficult to obtain.

The invention thus provides a liquid testing device of a sturdy, economical construction and having a simple mode of operation, which will at all times give an accurate indication of the condition or quality of a body of liquid. The invention is especially advantageous for use on self propelled vehicles run by internal combustion engines to indicate the quality of the crank case oil and to warn the operator of undue dilution of such oil by the gasoline or of the breaking down and cracking of the oil due to excessive temperature conditions. The present invention overcomes in a large measure the undersirable vibration effects often present in the operation of self propelled vehicles, such as automobiles, by insuring a relatively undisturbed body of liquid for the hydrometer and thus renders instant and accurate readings possible.

We claim as our invention:

1. In a liquid testing device, a reservoir for the liquid to be tested, a hydrometer in said reservoir to indicate the specific gravity of the liquid therein, an inlet conduit opening into said reservoir adjacent its lower end, said conduit having a portion extending to a point above the level of the liquid in said reservoir, valve means at the upper part of said conduit for controlling the flow of liquid thereto, and an observation window in said conduit for observing the flow of liquid therethrough.

2. In a liquid testing device, a reservoir for the liquid to be tested, a hydrometer in said reservoir to indicate the specific gravity of the liquid therein, an inlet conduit opening into said reservoir adjacent its lower end and extending to a point above the level of the liquid in said reservoir, valve means at the upper part of said conduit for controlling the flow of liquid thereto, an observation window in said conduit for observing the flow of liquid therethrough, and there being an overflow opening in said reservoir adapted to maintain the liquid therein at substantially a constant level.

3. In a liquid testing device, a reservoir for the liquid to be tested, a hydrometer in said reservoir to indicate the specific gravity of the liquid therein, baffle means associated with said hydrometer adapted to prevent turbulence of liquid in contact therewith, said baffle means comprising an inner casing surrounding said hydrometer and having openings therein at the lower end thereof, a baffle ring between said casing and the walls of said reservoir adapted to space said casing within said reservoir, and means for conducting liquid to be tested within said space.

4. In a liquid testing device, a reservoir for the liquid to be tested, a hydrometer in said reservoir to indicate the specific gravity of the liquid therein, an inlet conduit opening into said reservoir adjacent its lower end and extending to a point above the level of the liquid in said reservoir, an outlet conduit, and baffle means associated with said hydrometer adapted to prevent turbulence of liquid in contact therewith, said baffle means comprising an inner casing surrounding said hydrometer and having inlet and outlet openings respectively adjacent the lower and upper ends thereof, and means for insuring passage through said casing of liquid flowing from said inlet conduit to said outlet conduit.

5. In a liquid testing device, a reservoir for the liquid to be tested, a hydrometer in said reservoir to indicate the specific gravity of the liquid therein, an inlet conduit opening into said reservoir adjacent its lower end, baffle means associated with said hydrometer adapted to prevent turbulence of liquid in contact therewith, said baffle means comprising an inner casing surrounding said hydrometer and having inlet and outlet openings respectively adjacent the lower and upper ends thereof, and a baffle ring disposed between said inlet and outlet openings and contacting with the outer walls of said casing and the inner walls of said reservoir to hold said casing spaced from the walls of the reservoir.

6. In a liquid testing device, a reservoir for the liquid to be tested, a hydrometer in said reservoir to indicate the specific gravity of liquid therein, baffle means associated with said hydrometer, said baffle means comprising an inner casing surrounding said hydrometer, a baffle ring disposed between the walls of said casing and reservoir, there being inlet openings respectively in said reservoir and casing below said ring and outlet openings respectively in said reservoir and casing above said ring, and means for regulating the flow of liquid to the inlet opening in said reservoir.

7. In a liquid testing device, a reservoir for the liquid to be tested, a hydrometer in said reservoir to indicate the specific gravity of the liquid therein, an inlet conduit opening into said reservoir adjacent its lower end and extending to a point above the level of the liquid in said reservoir, baffle means associated with said hydrometer adapted to prevent turbulence of liquid in contact therewith, said baffle means comprising an inner perforated casing surrounding said hydrometer, common means for closing the upper ends of said reservoir and inner casing and holding their walls spaced, and additional means below said common closing means for maintaining said inner casing in spaced relationship to said reservoir.

8. In a liquid testing device, a reservoir for the liquid to be tested, a hydrometer in said reservoir to indicate the specific gravity of the liquid therein, an inlet conduit opening into said reservoir adjacent its lower end, baffle means associated with said hydrometer adapted to prevent turbulence of liquid in contact therewith, said baffle means comprising an inner perforated casing surrounding said hydrometer, and a cap member having a screw threaded connection with the upper ends of said reservoir and inner casing serving to close said ends and to hold said casing spaced within said reservoir.

9. In a liquid testing device, a reservoir for the liquid to be tested, a hydrometer in said reservoir to indicate the specific gravity of the liquid therein, an inlet conduit opening into said reservoir adjacent its lower end, baffle means associated with said hydrometer adapted to prevent turbulence of liquid in contact therewith, said baffle means comprising an inner perforated casing surrounding said hydrometer, and a cap member having a screw threaded connection with the upper ends of said reservoir and inner casing serving to close said ends and to hold said casing spaced within said reservoir, said cap member having means thereon for guiding the upper portion of said hydrometer.

10. In a liquid testing device, a reservoir for the liquid to be tested, an auxiliary chamber at the lower end thereof having an opening therein communicating with said reservoir at a point spaced above the lower end of the auxiliary chamber, a hydrometer in said reservoir, a thermometer having a portion thereof enclosed within said auxiliary chamber, a liquid inlet conduit connected with said auxiliary chamber, and an outlet opening in said reservoir adjacent its upper end.

11. In a liquid testing device, a reservoir for the liquid to be tested, an auxiliary chamber at the lower end thereof separated from the interior of said reservoir by a baffle wall and having an opening therethrough for the passage of liquid from the auxiliary chamber to said reservoir, said opening being spaced above the lower end of said auxiliary chamber, a hydrometer in said reservoir, a thermometer having the bulb thereof enclosed within said auxiliary chamber, a liquid inlet conduit connected with said auxiliary chamber, and there being an outlet opening in said reservoir adjacent its upper end.

12. In a liquid testing device, a reservoir for the liquid to be tested, an auxiliary chamber at the lower end thereof separated from the interior of said reservoir by a baffle wall and having an opening therethrough for the passage of liquid from the auxiliary chamber to said reservoir, said opening being spaced above the lower end of said reservoir whereby a trap is formed in the lower end of said reservoir, a hydrometer in said reservoir, a thermometer having the end thereof in said auxiliary chamber, a liquid inlet conduit opening into said auxiliary chamber, baffle means surrounding said hydrometer adapted to prevent turbulence of the liquid in contact with said hydrometer, and a liquid outlet conduit opening into said reservoir adjacent its upper end adapted to maintain the liquid at a substantially constant level in said reservoir.

13. In a liquid testing device, the combination with a reservoir for a liquid to be tested, of an inner casing within said reservoir, a hydrometer within said casing, said casing having inlet and outlet openings, an inlet conduit leading to said reservoir, an outlet conduit leading therefrom, and means for causing liquid entering through said inlet conduit to pass through said casing before reaching said outlet conduit, said means preventing free flow of liquid directly from said inlet conduit to said outlet conduit outside of said casing.

ROBERT H. MANCHESTER.
LEONARD W. ELY.